United States Patent
Shabtay

(10) Patent No.: US 12,007,668 B2
(45) Date of Patent: Jun. 11, 2024

(54) SPLIT SCREEN FEATURE FOR MACRO PHOTOGRAPHY

(71) Applicant: Corephotonics Ltd., Tel Aviv (IL)

(72) Inventor: Gal Shabtay, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/762,948

(22) PCT Filed: Jan. 27, 2021

(86) PCT No.: PCT/IB2021/050639
§ 371 (c)(1),
(2) Date: Mar. 23, 2022

(87) PCT Pub. No.: WO2021/165764
PCT Pub. Date: Aug. 26, 2021

(65) Prior Publication Data
US 2022/0385831 A1   Dec. 1, 2022

Related U.S. Application Data

(60) Provisional application No. 63/080,047, filed on Sep. 18, 2020, provisional application No. 63/032,576, (Continued)

(51) Int. Cl.
*G03B 13/02* (2021.01)
*G03B 37/04* (2021.01)
(Continued)

(52) U.S. Cl.
CPC .............. *G03B 13/02* (2013.01); *G03B 37/04* (2013.01); *G06V 10/147* (2022.01); *H04N 23/45* (2023.01); *H04N 23/635* (2023.01); *H04N 23/67* (2023.01)

(58) Field of Classification Search
CPC ........ G03B 13/02; G03B 37/04; G03B 13/06; G03B 30/00; G06V 10/147; H04N 23/45; (Continued)

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Gevell V Selby
(74) *Attorney, Agent, or Firm* — Menachem Nathan; Nathan & Associates

(57) ABSTRACT

Mobile electronic devices comprising a first camera with a first field of view $FOV_1$, a second, Macro camera with a Macro field of view $FOV_M$ smaller than $FOV_1$, and a device screen that includes a first screen section configured to display first image data from the first camera and a second screen section configured to display second image data from the Macro camera when both cameras are focused to a distance equal to or smaller than 30 cm.

19 Claims, 4 Drawing Sheets

Related U.S. Application Data filed on May 30, 2020, provisional application No. 62/980,184, filed on Feb. 22, 2020.

(51) Int. Cl.
  *G06V 10/147* (2022.01)
  *H04N 23/45* (2023.01)
  *H04N 23/63* (2023.01)
  *H04N 23/67* (2023.01)

(58) Field of Classification Search
  CPC ...... H04N 23/635; H04N 23/67; H04N 23/69; H04N 23/57; G02B 13/001; G02B 13/06
  See application file for complete search history.

(56) References Cited

U.S. PATENT DOCUMENTS

| | | | |
|---|---|---|---|
| 5,032,917 | A | 7/1991 | Aschwanden |
| 5,041,852 | A | 8/1991 | Misawa et al. |
| 5,051,830 | A | 9/1991 | von Hoessle |
| 5,099,263 | A | 3/1992 | Matsumoto et al. |
| 5,248,971 | A | 9/1993 | Mandl |
| 5,287,093 | A | 2/1994 | Amano et al. |
| 5,394,520 | A | 2/1995 | Hall |
| 5,436,660 | A | 7/1995 | Sakamoto |
| 5,444,478 | A | 8/1995 | Lelong et al. |
| 5,459,520 | A | 10/1995 | Sasaki |
| 5,657,402 | A | 8/1997 | Bender et al. |
| 5,682,198 | A | 10/1997 | Katayama et al. |
| 5,768,443 | A | 6/1998 | Michael et al. |
| 5,926,190 | A | 7/1999 | Turkowski et al. |
| 5,940,641 | A | 8/1999 | McIntyre et al. |
| 5,982,951 | A | 11/1999 | Katayama et al. |
| 6,101,334 | A | 8/2000 | Fantone |
| 6,128,416 | A | 10/2000 | Oura |
| 6,148,120 | A | 11/2000 | Sussman |
| 6,208,765 | B1 | 3/2001 | Bergen |
| 6,268,611 | B1 | 7/2001 | Pettersson et al. |
| 6,549,215 | B2 | 4/2003 | Jouppi |
| 6,611,289 | B1 | 8/2003 | Yu et al. |
| 6,643,416 | B1 | 11/2003 | Daniels et al. |
| 6,650,368 | B1 | 11/2003 | Doron |
| 6,680,748 | B1 | 1/2004 | Monti |
| 6,714,665 | B1 | 3/2004 | Hanna et al. |
| 6,724,421 | B1 | 4/2004 | Glatt |
| 6,738,073 | B2 | 5/2004 | Park et al. |
| 6,741,250 | B1 | 5/2004 | Furlan et al. |
| 6,750,903 | B1 | 6/2004 | Miyatake et al. |
| 6,778,207 | B1 | 8/2004 | Lee et al. |
| 7,002,583 | B2 | 2/2006 | Rabb, III |
| 7,015,954 | B1 | 3/2006 | Foote et al. |
| 7,038,716 | B2 | 5/2006 | Klein et al. |
| 7,199,348 | B2 | 4/2007 | Olsen et al. |
| 7,206,136 | B2 | 4/2007 | Labaziewicz et al. |
| 7,248,294 | B2 | 7/2007 | Slatter |
| 7,256,944 | B2 | 8/2007 | Labaziewicz et al. |
| 7,305,180 | B2 | 12/2007 | Labaziewicz et al. |
| 7,339,621 | B2 | 3/2008 | Fortier |
| 7,346,217 | B1 | 3/2008 | Gold, Jr. |
| 7,365,793 | B2 | 4/2008 | Cheatle et al. |
| 7,411,610 | B2 | 8/2008 | Doyle |
| 7,424,218 | B2 | 9/2008 | Baudisch et al. |
| 7,509,041 | B2 | 3/2009 | Hosono |
| 7,533,819 | B2 | 5/2009 | Barkan et al. |
| 7,619,683 | B2 | 11/2009 | Davis |
| 7,738,016 | B2 | 6/2010 | Toyofuku |
| 7,773,121 | B1 | 8/2010 | Huntsberger et al. |
| 7,809,256 | B2 | 10/2010 | Kuroda et al. |
| 7,880,776 | B2 | 2/2011 | LeGall et al. |
| 7,918,398 | B2 | 4/2011 | Li et al. |
| 7,964,835 | B2 | 6/2011 | Olsen et al. |
| 7,978,239 | B2 | 7/2011 | Deever et al. |
| 8,115,825 | B2 | 2/2012 | Culbert et al. |
| 8,149,327 | B2 | 4/2012 | Lin et al. |
| 8,154,610 | B2 | 4/2012 | Jo et al. |
| 8,238,695 | B1 | 8/2012 | Davey et al. |
| 8,274,552 | B2 | 9/2012 | Dahi et al. |
| 8,390,729 | B2 | 3/2013 | Long et al. |
| 8,391,697 | B2 | 3/2013 | Cho et al. |
| 8,400,555 | B1 | 3/2013 | Georgiev et al. |
| 8,439,265 | B2 | 5/2013 | Ferren et al. |
| 8,446,484 | B2 | 5/2013 | Muukki et al. |
| 8,483,452 | B2 | 7/2013 | Ueda et al. |
| 8,514,491 | B2 | 8/2013 | Duparre |
| 8,547,389 | B2 | 10/2013 | Hoppe et al. |
| 8,553,106 | B2 | 10/2013 | Scarff |
| 8,587,691 | B2 | 11/2013 | Takane |
| 8,619,148 | B1 | 12/2013 | Watts et al. |
| 8,803,990 | B2 | 8/2014 | Smith |
| 8,896,655 | B2 | 11/2014 | Mauchly et al. |
| 8,976,255 | B2 | 3/2015 | Matsuoto et al. |
| 9,019,387 | B2 | 4/2015 | Nakano |
| 9,025,073 | B2 | 5/2015 | Attar et al. |
| 9,025,077 | B2 | 5/2015 | Attar et al. |
| 9,041,835 | B2 | 5/2015 | Honda |
| 9,137,447 | B2 | 9/2015 | Shibuno |
| 9,185,291 | B1 | 11/2015 | Shabtay et al. |
| 9,215,377 | B2 | 12/2015 | Sokeila et al. |
| 9,215,385 | B2 | 12/2015 | Luo |
| 9,270,875 | B2 | 2/2016 | Brisedoux et al. |
| 9,286,680 | B1 | 3/2016 | Jiang et al. |
| 9,344,626 | B2 | 5/2016 | Silverstein et al. |
| 9,360,671 | B1 | 6/2016 | Zhou |
| 9,369,621 | B2 | 6/2016 | Malone et al. |
| 9,413,930 | B2 | 8/2016 | Geerds |
| 9,413,984 | B2 | 8/2016 | Attar et al. |
| 9,420,180 | B2 | 8/2016 | Jin |
| 9,438,792 | B2 | 9/2016 | Nakada et al. |
| 9,485,432 | B1 | 11/2016 | Medasani et al. |
| 9,578,257 | B2 | 2/2017 | Attar et al. |
| 9,618,748 | B2 | 4/2017 | Munger et al. |
| 9,681,057 | B2 | 6/2017 | Attar et al. |
| 9,723,220 | B2 | 8/2017 | Sugie |
| 9,736,365 | B2 | 8/2017 | Laroia |
| 9,736,391 | B2 | 8/2017 | Du et al. |
| 9,768,310 | B2 | 9/2017 | Ahn et al. |
| 9,800,798 | B2 | 10/2017 | Ravirala et al. |
| 9,851,803 | B2 | 12/2017 | Fisher et al. |
| 9,894,287 | B2 | 2/2018 | Qian et al. |
| 9,900,522 | B2 | 2/2018 | Lu |
| 9,927,600 | B2 | 3/2018 | Goldenberg et al. |
| 10,841,481 | B2 * | 11/2020 | Nagao ................ G06F 3/04845 |
| 2002/0005902 | A1 | 1/2002 | Yuen |
| 2002/0030163 | A1 | 3/2002 | Zhang |
| 2002/0063711 | A1 | 5/2002 | Park et al. |
| 2002/0075258 | A1 | 6/2002 | Park et al. |
| 2002/0122113 | A1 | 9/2002 | Foote |
| 2002/0167741 | A1 | 11/2002 | Koiwai et al. |
| 2003/0030729 | A1 | 2/2003 | Prentice et al. |
| 2003/0093805 | A1 | 5/2003 | Gin |
| 2003/0160886 | A1 | 8/2003 | Misawa et al. |
| 2003/0202113 | A1 | 10/2003 | Yoshikawa |
| 2004/0008773 | A1 | 1/2004 | Itokawa |
| 2004/0012683 | A1 | 1/2004 | Yamasaki et al. |
| 2004/0017386 | A1 | 1/2004 | Liu et al. |
| 2004/0027367 | A1 | 2/2004 | Pilu |
| 2004/0061788 | A1 | 4/2004 | Bateman |
| 2004/0141065 | A1 | 7/2004 | Hara et al. |
| 2004/0141086 | A1 | 7/2004 | Mihara |
| 2004/0240052 | A1 | 12/2004 | Minefuji et al. |
| 2005/0013509 | A1 | 1/2005 | Samadani |
| 2005/0046740 | A1 | 3/2005 | Davis |
| 2005/0157184 | A1 | 7/2005 | Nakanishi et al. |
| 2005/0168834 | A1 | 8/2005 | Matsumoto et al. |
| 2005/0185049 | A1 | 8/2005 | Iwai et al. |
| 2005/0200718 | A1 | 9/2005 | Lee |
| 2006/0054782 | A1 | 3/2006 | Olsen et al. |
| 2006/0056056 | A1 | 3/2006 | Ahiska et al. |
| 2006/0067672 | A1 | 3/2006 | Washisu et al. |
| 2006/0102907 | A1 | 5/2006 | Lee et al. |
| 2006/0125937 | A1 | 6/2006 | LeGall et al. |
| 2006/0170793 | A1 | 8/2006 | Pasquarette et al. |
| 2006/0175549 | A1 | 8/2006 | Miller et al. |
| 2006/0187310 | A1 | 8/2006 | Janson et al. |

(56) References Cited

U.S. PATENT DOCUMENTS

| | | |
|---|---|---|
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0185047 A1* | 7/2009 | Takachi .............. G03B 17/02 348/222.1 |
| 2009/0190909 A1 | 7/2009 | Mise et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0128395 A1* | 6/2011 | Choi .............. H04N 23/635 348/222.1 |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Wang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2016/0381289 A1* | 12/2016 | Kim .............. H04N 23/69 348/38 |
| 2017/0019616 A1 | 1/2017 | Zhu et al. |
| 2017/0070731 A1 | 3/2017 | Darling et al. |
| 2017/0094187 A1* | 3/2017 | Sharma .............. G02B 7/09 |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |

(56) References Cited

U.S. PATENT DOCUMENTS

| | | |
|---|---|---|
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0368656 A1 | 12/2018 | Austin et al. |
| 2019/0121103 A1 | 4/2019 | Bachar et al. |
| 2019/0289201 A1* | 9/2019 | Nishimura ........... H04N 23/633 |

FOREIGN PATENT DOCUMENTS

| | | |
|---|---|---|
| CN | 102215373 A | 10/2011 |
| CN | 102739949 A | 10/2012 |
| CN | 103024272 A | 4/2013 |
| CN | 103841404 A | 6/2014 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20110082494 A | 7/2011 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

European Search Report in related EP patent application 21757234.6, dated Dec. 7, 2022.

Office Action in related EP patent application 21757234.6, dated Dec. 20, 2022.

Office Action in related KR patent application 2022-7010978, dated Oct. 17, 2023.

* cited by examiner

SPLIT SCREEN FEATURE FOR MACRO PHOTOGRAPHY

CROSS REFERENCE TO RELATED APPLICATIONS

This is a 371 application from international patent application PCT/IB2021/050639 filed Jan. 27, 2021, and is related to and claims the benefit of priority from U.S. Provisional patent applications No. 62/980,184 filed 22 Feb. 2020, U.S. Pat. No. 63,032,576 filed 30 May 2020, and U.S. Pat. No. 63,080,047 filed 18 Sep. 2020, all of which are incorporated herein by reference in their entirety.

FIELD

The subject matter disclosed herein relates in general to Macro images and in particular to methods for obtaining such images with multi-cameras (e.g. dual-cameras).

BACKGROUND

Multi-aperture digital cameras (or multi-cameras) are standard for mobile electronic devices (e.g. smartphones, tablets, etc.). A multi-camera usually comprises a camera with a wide field-of-view (or "angle") $FOV_W$ ("Wide" camera), and at least one additional camera, either with the same FOV (e.g. a depth auxiliary camera), with a narrower (than $FOV_W$) field of view $FOV_T$ (Telephoto or "Tele" camera), or with an ultra-wide field of view $FOV_{UW}$ wider than $FOV_W$ ("UW camera"). In some embodiments below, a Wide or Ultra-Wide camera may be referred to as a "non-Macro camera".

A "Macro-photography" mode is becoming a popular differentiator for smartphone cameras. "Macro-photography" refers to photographing objects that are very close to the camera, so that the image size of an object recorded on the image sensor is nearly as large as the actual size of the object photographed, i.e. it has a large object: image magnification (M) of e.g. 10:1 to 1:1. Such an image may be referred to as "Macro image". First smartphones that include a Macro camera with a Macro FOV ($FOV_M$), often based on an UW camera have entered the consumer market. A Macro camera can be realized with a Tele camera. An advantage is the high magnification M of a Macro images captures with a Tele camera, so that one may speak of a "Super Macro Image". In some examples, the Macro camera may be a scanning Tele camera which can scan a scene with its native $FOV_M$, for example as described in co-owned U.S. Pat. No. 10,578,948.

Macro images are recorded at very small object-camera distances of around 20 cm or less. A UW camera may still be capable to focus to these small distances. Generally, very small objects (e.g., less than 1 cm in size) are targeted as image objects (i.e. are objects of interest or "OOIs"). Such very small OOIs for a Macro image may be occluded by the multi-camera hosting device, making it difficult to point the Macro camera to capture the OOI in a precise manner. This is especially significant when $FOV_M$ captures a small area (e.g. a few square millimeters) of an object (e.g., placed 2 cm to 10 cm away from the camera) while being integrated in a large device. It would be beneficial to have a method that supports a quick and user-friendly way to direct a Macro camera $FOV_M$ towards very small OOIs.

SUMMARY

In some embodiments there is provided a split screen view on a multi-camera hosting device showing a preview image segment of an ultra-wide camera FOV together with a preview image segment of the $FOV_M$ to support the targeting of an OOI with the $FOV_M$.

The image segment of an ultra-wide camera FOV being displayed to the user may contain some differentiating element marking the area of the OOI that is to be captured by the Macro mode.

Such differentiating element marking may include a touchable box, for example a rectangular box. The user may get a feedback on the screen in which direction the multi-camera hosting device is to be moved to catch the OOI with the $FOV_M$.

In various embodiments there are provided mobile electronic devices, comprising a first camera with a first field of view $FOV_1$, a second, Macro camera with a Macro field of view $FOV_M$ smaller than $FOV_1$ and a device screen that includes a first screen section configured to display first image data from the first camera and a second screen section configured to display second image data from the Macro camera when both cameras are focused to a distance equal to or smaller than 30 cm.

In some embodiments, the $FOV_M$ is shown and marked within the first screen section.

In some embodiments, the first screen section includes a visual indication for guiding a user of the mobile electronic device towards a scene using the $FOV_M$.

In some embodiments, the second screen section displays first image data from the first camera.

In some embodiments, a device further comprises a controller for controlling a change in state of the Macro camera based on the first image data. In some embodiments, the state of the Macro camera is a zoom state. In some embodiments, the state of the Macro camera is a focus state.

In some embodiments, the first camera has a focal length between 2 and 7 mm.

In some embodiments, the Macro camera has a focal length between 12 and 40 mm.

In some embodiments, the Macro camera has a focal length between 14 and 30 mm.

In some embodiments, the Macro camera has a focal length between 15 and 20 mm.

In some embodiments, both cameras can be focused to a distance smaller than 20 cm.

In some embodiments, both cameras can be focused to a distance of 10 cm or less.

In some embodiments, at least one camera can be focused to a distance between 5 and 10 cm.

In some embodiments, at least one camera can be focused to a distance of 5 cm or less.

In some embodiments, at least one camera can be focused to a distance of 3 cm or less.

In some embodiments, the first camera is an Ultra-Wide camera.

In some embodiments, the first camera is a Wide camera.

In some embodiments, the Macro camera is a scanning Tele camera. In some embodiments, the device further comprises a controller for controlling a change of a scan state of the Macro camera based on the first image data.

In some embodiments, the Macro camera is a Tele camera having different zoom states.

In some embodiments, the first camera is focused to a first distance different from a second distance that the Macro camera is focused to.

In some embodiments, the first screen section and the second screen section are split vertically when the mobile electronic device is held in a landscape orientation, and the first screen section and the second screen section are split horizontally when the mobile electronic device is held in a portrait orientation.

In some embodiments, the device is a smartphone.

In some embodiments, the device further comprises a controller for controlling a change of a scan state of the Macro camera based on the first image data.

In various embodiments there are provided methods, comprising providing a mobile electronic device that includes a first camera with a first field of view $FOV_1$, a second, Macro camera with a Macro field of view $FOV_M$ smaller than $FOV_1$, and a device screen, focusing the first camera and the Macro camera to a distance ≤30 cm, and displaying on a first section of the device screen first image data from the first camera and displaying on a second section of the device screen second image data from the second camera.

In some embodiments, the focusing of the first camera and of the Macro camera to a distance ≤30 cm includes focusing the first camera to a first distance ≤30 cm and focusing the Macro camera to a distance ≤30 cm different from the first distance.

In some embodiments, the focusing of the first camera and of the Macro camera to a distance ≤30 cm includes focusing both cameras to a distance of 20 cm or less.

In some embodiments, the focusing of the first camera and of the Macro camera to a distance ≤30 cm includes focusing both cameras to a distance of 10 cm or less.

In some embodiments, the focusing of the first camera and of the Macro camera to a distance ≤30 cm includes focusing both cameras or one of the cameras to a distance of 5 cm or less.

In some embodiments, the focusing of the first camera and of the Macro camera to a distance ≤30 cm includes focusing both cameras or one of the cameras to a distance of 3 cm or less. In some embodiments, a method further comprises showing and marking the $FOV_M$ within the first screen section.

In some embodiments, a method further comprises including in the first screen section a visual indication for guiding a user of the mobile electronic device towards a scene using the $FOV_M$.

In some embodiments, a method further comprises displaying the first image data in the second screen section.

In some embodiments, a method further comprises controlling a change in state of the Macro camera based on the first image data.

In some embodiments, the controlling a change in state of the Macro camera includes controlling a change of a state selected from the group consisting of a scan state, a zoom state and a focus state of the Macro camera.

In some embodiments, the Macro camera is a scanning Tele camera and the controlling a change in state of the Macro camera based on the first image data includes automatically controlling a change of a scan state of the scanning Tele camera.

In some embodiments, the Macro camera is a Tele camera having different zoom states and the controlling a change in state of the Macro camera includes automatically controlling a change of a zoom state of the Tele camera.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

DETAILED DESCRIPTION

Embodiments disclosed herein solve the problem of occlusion of an object of interest when Macro-photography is performed with multi-cameras included in smartphones and other mobile electronic devices. For simplicity and for example only, the solution is illustrated with a dual-camera, with the understanding that it is also clearly applicable with multi-cameras having three or more cameras.

Figure 1:
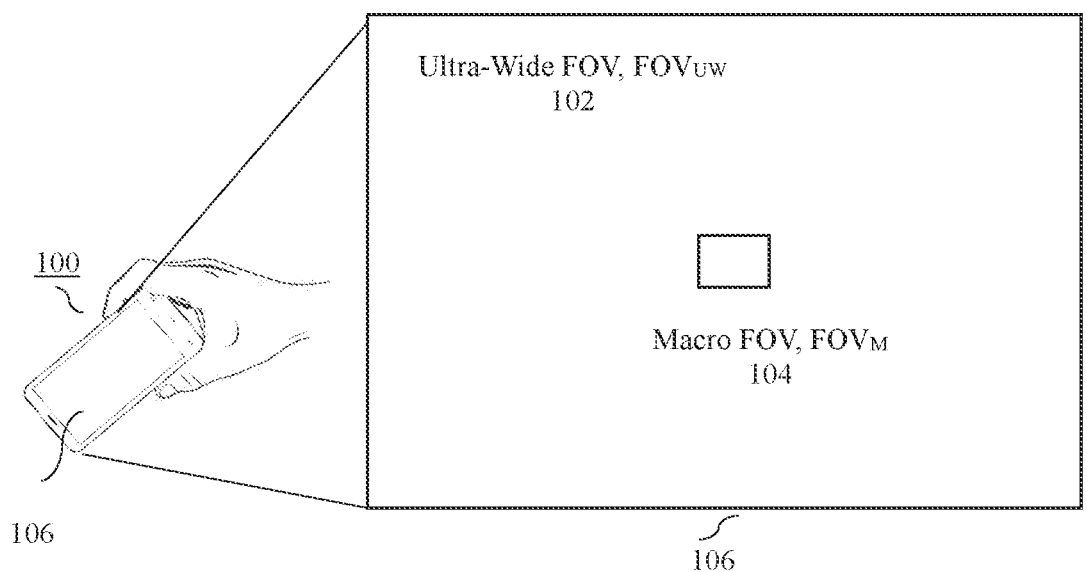
FIG. 1 shows schematically dual-camera output image sizes and ratios between an ultra-wide FOV and a Macro FOV.

FIG. 1 illustrates a typical field of-view (FOV) ratio of smartphone 100 including a multi-camera (not shown) that includes a UW camera with a $FOV_{UW}$ 102 covering a large segment of a scene and a Macro camera with a $FOV_M$ 104 covering a small segment of a scene. One can see exemplary sizes and ratios between UW and Macro output images.

In some examples, the Macro camera may be a continuous Tele zoom camera where $FOV_M$ changes with changing ZF.

Figure 2A:
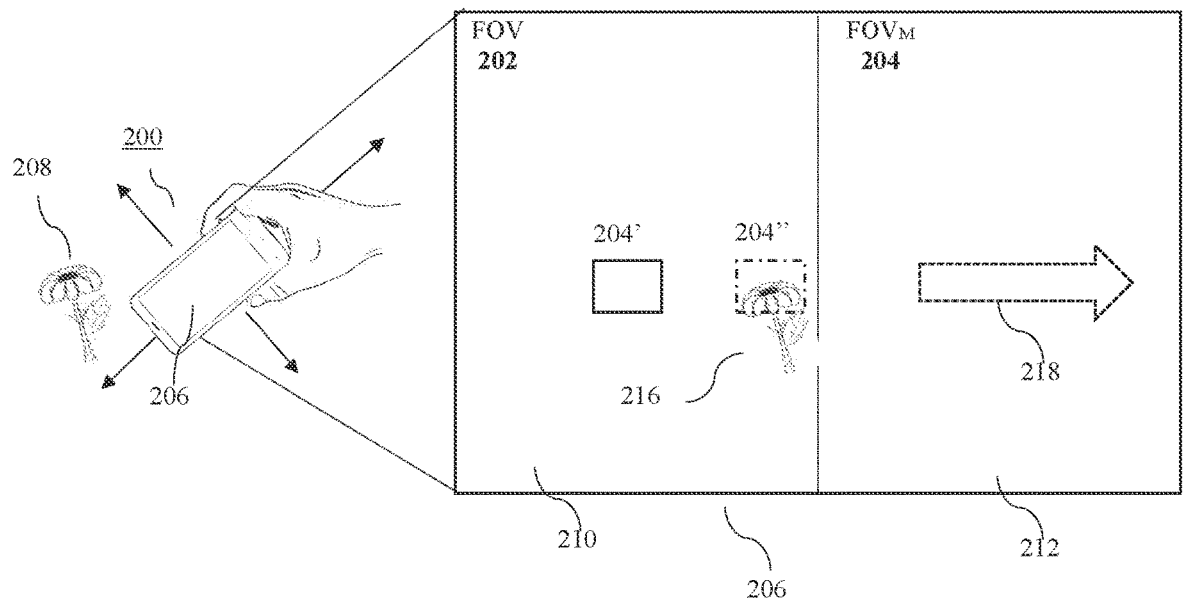
FIG. 2A illustrates a smartphone having an ultra-wide camera, a Macro camera, and a screen split into two sections, one exhibiting $FOV_{UW}$ (or a cropped area of it) and one exhibiting $FOV_M$ (or a cropped area of it), according to an embodiment disclosed herein.

FIG. 2A illustrates an embodiment numbered 200 of a smartphone having a UW camera with a $FOV_{UW}$ 202 and a Macro camera with a $FOV_M$ 204 and a screen (display) 206 according to presently disclosed subject matter. A system description of smartphone 200 is given in FIG. 5. As indicated by four arrows in FIG. 2A-C, smartphone 200 may be moved by a user in four or more directions for manually moving $FOV_M$ towards an OOI/ROI. Screen 206 illustrates a first screen example for displaying images of a multi-camera. Macro photography is required to capture small objects from a close range. The Macro camera may include a Tele lens with a focal length much larger (e.g., 3 times to 25 times) than the focal length of the UW camera. In such a case, the UW camera can easily focus to a close range (e.g. 2 cm to 30 cm), but its spatial resolution is poor since its focal length is small and its FOV is large. For example, consider a UW camera with 2.5 mm focal length and a Macro camera with 25 mm focal length. The two cameras may include identical or different sensors (e.g., with identical or different pixel count and pixel size). Assume that both cameras include the same sensor, e.g., with 4 mm active image sensor width. When focused to 5 cm, the Macro camera will have a M of 1:1 and will capture an object width of 4 mm (same as the sensor width). The UW camera will have a M of 19:1 and will capture an object width of 76 mm.

In some examples, for performing a method disclosed herein, a smartphone like smartphone 200 may comprise, instead of or additionally to the UW camera with $FOV_{UW}$ 202, a W camera with a $FOV_W$ (not shown) that is smaller than $FOV_{UW}$ 202 but still larger than $FOV_M$. In some examples, the W camera may not be able to focus to an object as close as e.g. 10 cm. In such examples, for performing a method disclosed herein, the W camera may be focused to its minimal focus distance, e.g. to 20 cm.

The UW or W cameras mentioned above have a larger depth of field than a Macro capable Tele camera with $FOV_M$. A ROI is easier to detect in UW or W image data than in Macro image data. Therefore, one may use UW or W or M camera image data for automatic ROI detection and selection.

Figure 2B:
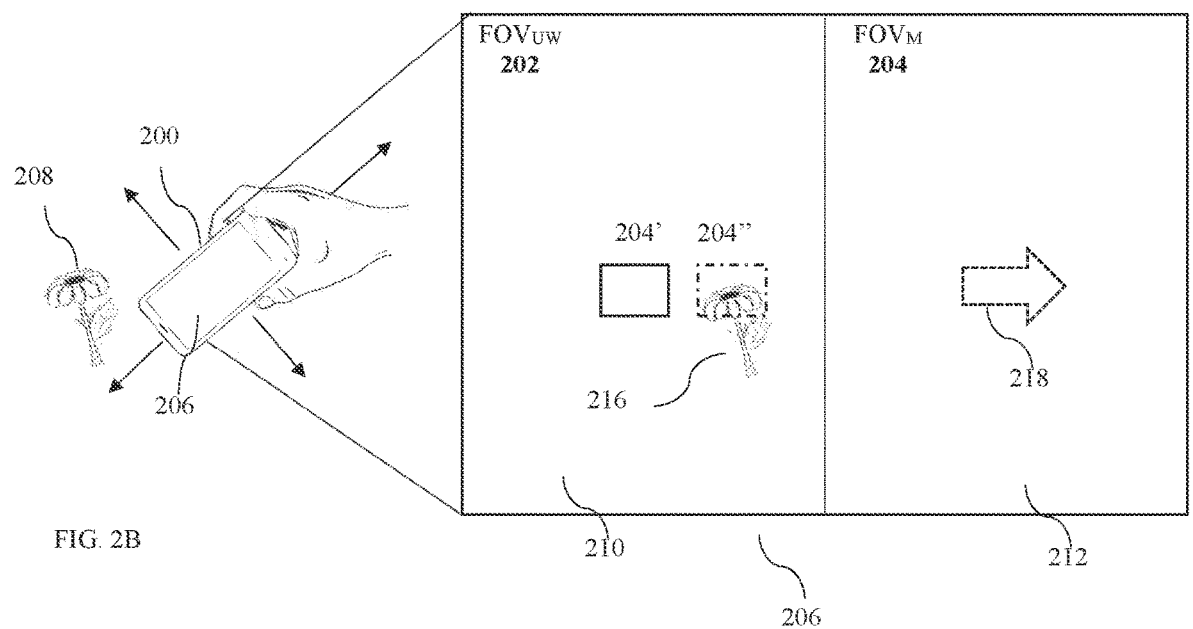
FIG. 2B illustrates a first stage in a process of moving the smartphone and the $FOV_M$ in the camera of FIG. 2A towards an OOI, as seen in each section of the screen.
Figure 2C:
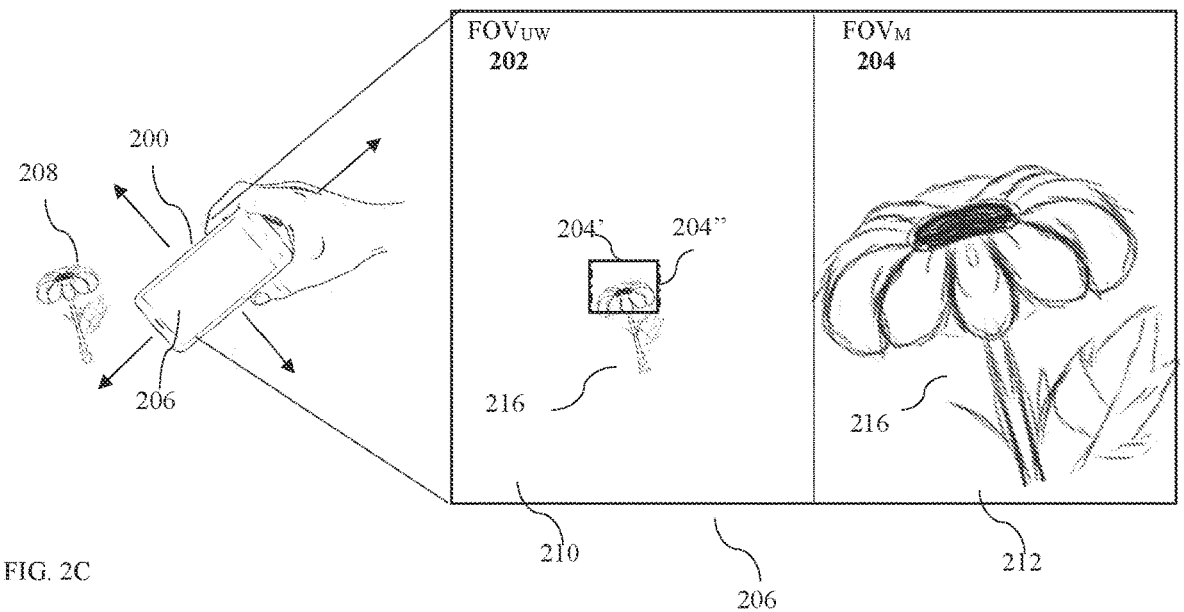
FIG. 2C illustrates a final stage in the process of moving the smartphone and the $FOV_M$ in the camera of FIG. 2A towards an OOI, as seen in each section of the screen.

In an exemplary case, a user wishes to use smartphone 200 for capturing an OOI (e.g. a flower 208 which forms an image 216 in a camera) or a ROI with very high (Macro) resolution. For methods of use as disclosed herein, screen 206 is split into two sections, a first section 210 (possibly cropped) and a second section 212. The first screen section may display first image data from the first camera with $FOV_1$ and the second screen section may display second image data from the second camera with $FOV_M$. The examples here show a "split screen" view on the screen, i.e. the two screen sections are shown side by side. In other examples (not shown) one may display a "picture-in-picture" view on the screen, i.e. one screen section may be shown as an inlay in the other screen section. In some examples, the second screen section may be shown on the entire screen or on a large segment of the screen except on a segment where the first screen section is shown, and wherein the first screen section covers a smaller area on the screen than the second screen. In the embodiment of FIGS. 2A-2C, the two screen sections have exemplarily a "landscape" orientation, i.e. first screen section and the second screen section are split vertically, beneficial when the device is held in landscape orientation. Screen 206 may include additional icons or symbols as known (not shown). First screen section 210 displays a cropped $FOV_{UW}$ (and can be therefore called "UW screen section 210") while second screen section 212 displays the Macro $FOV_M$ (and can be therefore called "Macro screen section 212"). Inside first section 210, $FOV_M$ 204 can be marked by a physical (i.e. visible on the screen) rectangle 204'. Rectangle 204' indicates the actual position of $FOV_M$ 204 with respect to $FOV_{UW}$ 202. Optionally, another physical rectangle 204" indicates a UW preview of OOI (flower) 208 in order to guide a user towards flower 208. The user can see the position of $FOV_M$ 204 relative to rectangle 204" at all times in UW screen section 210, while at the same time, Macro screen section 212 exhibits the scene within $FOV_M$. In use, the user moves the smartphone with camera towards flower 208. In Macro screen section 212, an arrow 218 indicates the direction and distance of movement required to align flower 208 with Macro $FOV_M$ 204. In some examples, image data from UW FOV 202 may be displayed in Macro screen section 212. This is for example beneficial when the Macro camera may not be in focus over entire camera $FOV_M$ 204 or when there are other optical or image quality issues.

FIG. 2B, 2C show the process of moving the smartphone (and the $FOV_M$) towards flower 208 (i.e. toward preview 216). In FIG. 2B, the UW screen section indicates that the movement of $FOV_M$ 204 brings it close to rectangle 204" (preview 216). The flower starts to appear in Macro screen section 212. In FIG. 2C, $FOV_M$ 204 is seen in the UW screen section as fully overlapping rectangle 204", while flower 208 is displayed fully in Macro screen section 212.

Figure 3:
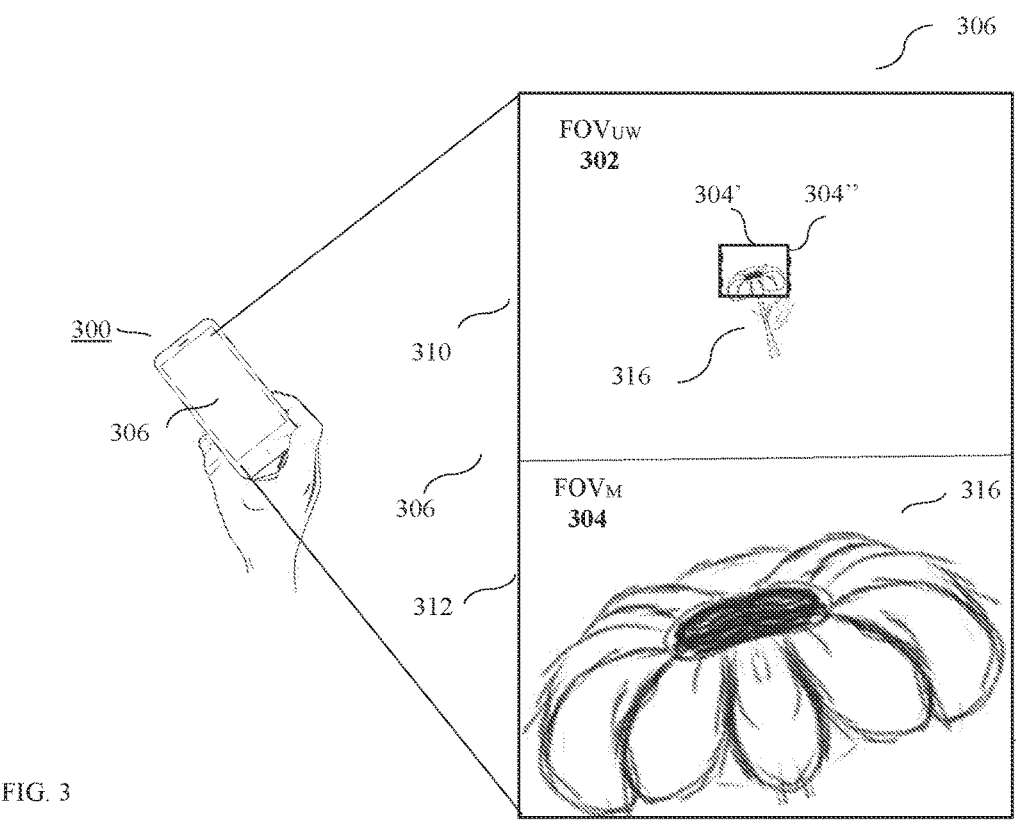
FIG. 3 shows a split screen view according to another embodiment disclosed herein.

FIG. 3 illustrates an embodiment numbered 300 of a smartphone having a UW camera with a $FOV_{UW}$ 302 and a Macro camera with a $FOV_M$ 304 and a screen 306 according to presently disclosed subject matter. Screen 306 is split into a UW screen section 310 and a Macro screen section 312, both in portrait orientation, i.e. first screen section and second screen section are split horizontally, beneficial when device is held in portrait orientation. As in FIG. 2C, inside first section 310, $FOV_M$ 304 is marked by a physical rectangle 304', and, optionally, another physical rectangle 304" indicates a UW preview of a flower 308 (which forms an image 316 in a camera) in order to guide the user towards flower 308.

Such a method or apparatus in which the screen is split and both the ultra-wide FOV and Macro FOV are shown allows the user to find an OOI and capture it with the Macro camera (and possibly also simultaneously with the UW camera) even if the handset (image capture device) occludes the OOI.

Figure 4:
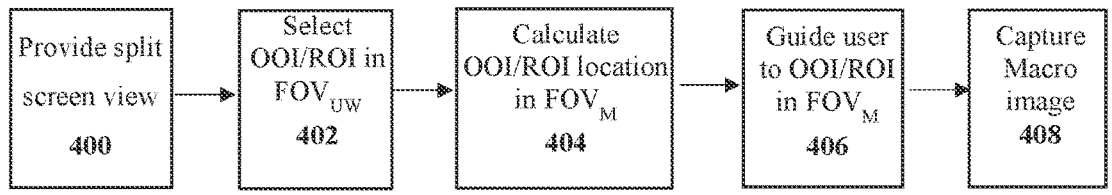
FIG. 4 shows in a flow chart of a method of use of a split screen for Macro-photography in a mobile electronic device, according to embodiments disclosed herein.

FIG. 4 shows in a flow chart of a method of use of a split screen for Macro-photography in a mobile electronic device, according to embodiments disclosed herein. In step 400, a screen of a mobile electronic device is split to display both a non-Macro (e.g. UW) camera image stream (or cropped version of it) and a Macro camera image stream (or cropped version of it) simultaneously. In step 402, an OOI/ROI as a scene for the Macro image is selected in the $FOV_{UW}$ of the UW camera by a dedicated algorithm running on OOI/ROI selector 546 or by a human user. $FOV_{UW}$ and $FOV_M$ are calibrated. As known in the art, the position of the OOI/ROI in $FOV_{UW}$ can be translated to a respective OOI/ROI position in $FOV_M$. In step 404, the respective position of the OOI/ROI with respect to $FOV_M$ is calculated based on the OOI/ROI location position in $FOV_{UW}$. In step 406, the user is visually or otherwise guided towards the OOI/ROI's location position with respect to the $FOV_M$. The visual or otherwise indication for the guiding may be visual (e.g. by arrow 218 shown in FIGS. 2A-B) or via a dedicated sound or via some haptic feedback. In some examples, user control unit 544 is configured to provide visual or otherwise indication. According to the guiding of step 406, the user moves the camera's hosting device (e.g. smartphone) until the OOI/ROI appears in $FOV_M$. In step 408, the user captures a Macro image (also referred to as "Super Macro image") of the OOI/ROI.

Figure 5:
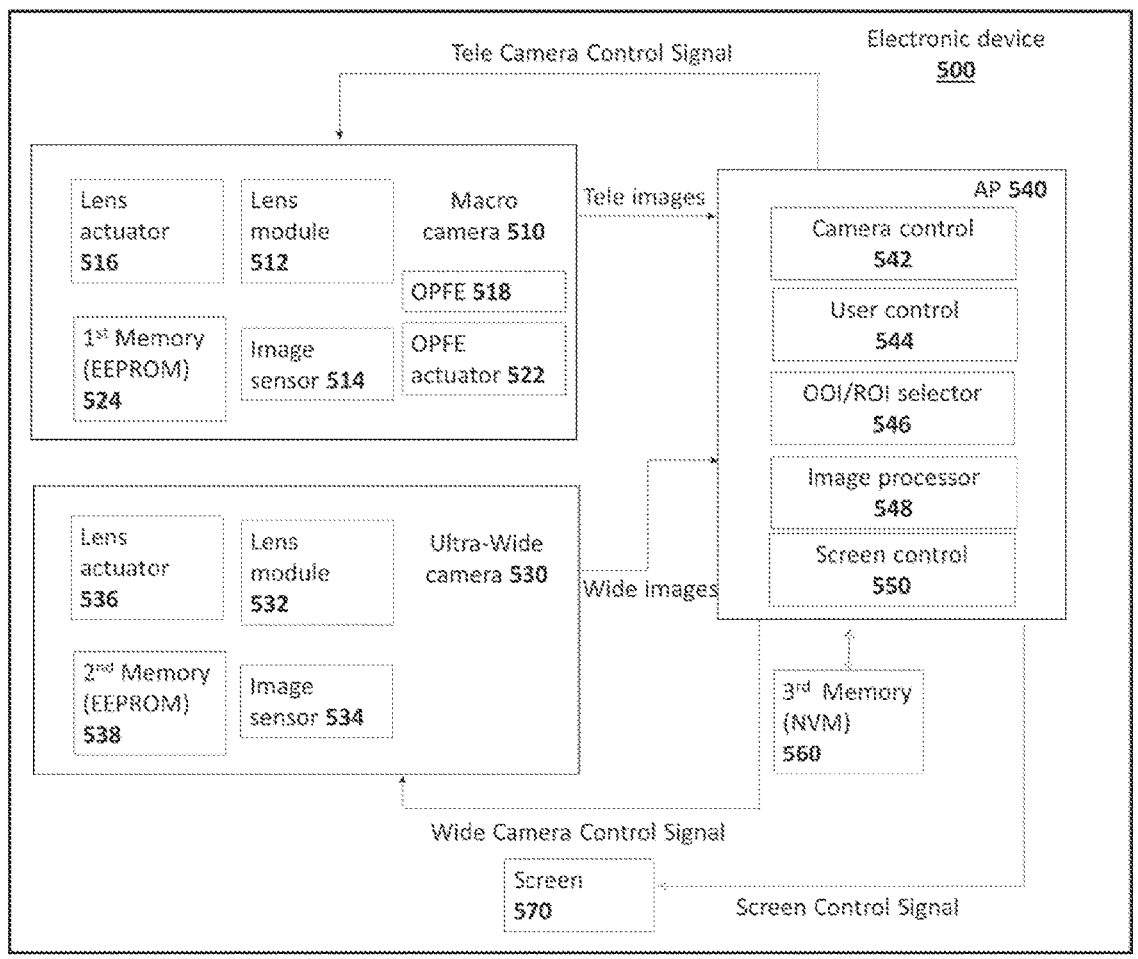
FIG. 5 shows schematically an embodiment of an electronic device including a multi-camera and configured to perform methods disclosed herein.

FIG. 5 shows schematically an embodiment of an electronic device (e.g. a smartphone) numbered 500 that includes a multi-camera and is configured to perform methods disclosed herein. Electronic device 500 comprises a Macro camera 510 with $FOV_M$. Macro camera 510 includes a Macro lens module 512 with a Macro lens, a Macro image sensor 514 and a lens actuator 516 for actuating Macro lens module 512. The Macro lens forms a Macro image recorded by Macro image sensor 514.

Optionally, the Macro lens may have a fixed effective focal length (EFL) providing a fixed zoom factor (ZF), or an adaptable (variable) EFL providing an adaptable ZF. The adaption of EFL may be discrete or continuous, i.e. a discrete number of varying EFLs for providing a plurality of discrete or continuous zoom states with respective ZFs. Camera 510 may be switched to a beneficial zoom state automatically.

Optionally, Macro camera 510 may be a folded camera that includes an OPFE 518 and an OPFE actuator 522 for actuating OPFE 518 for OIS and/or FOV scanning. In some embodiments, the FOV scanning of the Macro camera may be performed by actuating one or more OPFEs. A scanning Macro camera that performs FOV scanning by actuating two OPFEs is described for example in the co-owned U.S. provisional patent application No. 63/110,057 filed Nov. 5, 2020.

Macro camera module 510 further comprises a first memory 524, e.g. in an EEPROM (electrically erasable programmable read only memory). In some embodiments, first calibration data may be stored in memory 524. In other embodiments, the first calibration data may be stored in a third memory 560 such as a NVM (non-volatile memory). The first calibration data may comprise calibration data between image sensors 514 and 534.

Electronic device 500 further comprises a UW camera 530 with a $FOV_{UW}$ larger than $FOV_M$ of camera 510. UW camera 530 includes UW lens module 532 with a UW lens and a UW image sensor 534. A lens actuator 536 may move lens module 532 for focusing and/or OIS. In some embodiments, second calibration data may be stored in a second memory 538. In other embodiments, the second calibration data may be stored in third memory 560. The second calibration data may comprise calibration data between image sensors 514 and 534.

The Macro camera may have an effective focal length (EFL) of e.g. 8-30 mm or more, a diagonal FOV of 10-40 deg and a f number of about f/#=1.8-6. The UW camera may have an EFL of e.g. 2.5-8 mm, a diagonal FOV of 50-130 deg and a f/# of about 1.0-2.5.

In some embodiments, the Macro camera may cover about 50% of the area of the UW camera's FOV. In some embodiments, the Macro camera may cover about 10% or less of the area of the UW camera's FOV.

Electronic device 500 further comprises an application processor (AP) 540. Application processor 540 comprises a camera controller 542, a user control unit 544, OOI/ROI selector 546 and an image processor 548. Electronic device 500 further comprises a screen control 550 and a screen 570. Screen 570 may display methods as disclosed herein.

Returning now to the method of use as in FIG. 4, in some examples, the UW or W camera image data may be used by camera controller 542 to automatically change a state of the Macro camera (i.e. control a change of scan state of the Macro camera). The state may be a scan (or steer) state, a zoom state or a focus state. For example, UW or W camera image data may be used to steer (or scan) the $FOV_M$ of a scanning Tele camera automatically towards a ROI (change of scan state of the Macro camera). In an example, the Macro camera can steer itself, and step 406 of guiding $FOV_M$ to the ROI can be done automatically by camera control 542. As indicated above, the selection of an OOI/ROI in the $FOV_{UW}$ as a scene for the Macro image camera may be done by a dedicated algorithm running on OOI/ROI selector 546. In another example, the Macro camera may use UW or W image data to switch between zoom states. Camera controller 542 may switch the Macro camera to a beneficial zoom state automatically (i.e. control a change of zoom state of the Macro camera), e.g. while executing steps 404 and 406. A beneficial zoom state may be a state where a Macro OOI or ROI fully enters $FOV_M$. In yet another example, the W or UW camera's image data may be used by camera controller 542 to focus the Macro camera to a ROI within $FOV_M$ automatically (i.e. control a change of focus state of the Macro camera). An OOI or ROI spanning a segment of a scene which is larger than $FOV_M$ may be fully captured in two or more sequential frames wherein each frame includes a different segment of the OOI or ROI. The sequential frames together include image data on the OOI or ROI in its entirety and are stitched to a single image by image processor 548.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A mobile electronic device, comprising:
   a first camera with a first field of view $FOV_1$ and a focal length between 2 and 7 mm;
   a second, Macro camera with a Macro field of view $FOV_M$ smaller than $FOV_1$; and
   a device screen that includes a first screen section configured to display first image data from the first camera and a second screen section configured to display second image data from the Macro camera when both cameras are focused to a distance equal to or smaller than 30 cm.

2. The mobile electronic device of claim 1, wherein the $FOV_M$ is shown and marked within the first screen section.

3. The mobile electronic device of claim 1, wherein the first screen section includes a visual indication for guiding a user of the mobile electronic device towards a scene using the $FOV_M$.

4. The mobile electronic device of claim 1, wherein the second screen section displays first image data from the first camera.

5. The mobile electronic device of claim 1, further comprising a controller for controlling a change in state of the Macro camera based on the first image data.

6. The mobile electronic device of claim 1, wherein the first camera is a Wide camera.

7. The mobile electronic device of claim 1, wherein the Macro camera is a scanning Tele camera.

8. The mobile electronic device of claim 1, wherein the Macro camera is a Tele camera having different zoom states.

9. The mobile electronic device of claim 1, wherein the first camera is focused to a first distance different from a second distance that the Macro camera is focused to.

10. The mobile electronic device of claim 1, wherein the first screen section and the second screen section are split vertically when the mobile electronic device is held in a landscape orientation, and wherein the first screen section and the second screen section are split horizontally when the mobile electronic device is held in a portrait orientation.

11. The mobile electronic device of claim 1, wherein the device is a smartphone.

12. The mobile electronic device of claim 5, wherein the state of the Macro camera is a zoom state.

13. The mobile electronic device of claim 5, wherein the state of the Macro camera is a focus state.

14. The mobile electronic device of claim 7, further comprising a controller for controlling a change of a scan state of the Macro camera based on the first image data.

15. A mobile electronic device, comprising:
a first camera with a first field of view $FOV_1$;
a second, Macro camera with a Macro filed of view $FOV_M$ smaller than $FOV_1$, wherein the Macro camera has a focal length between 12 and 40 mm; and
a device screen that includes a first screen section configured to display first image data from the first camera and a second screen section configured to display second image data from the Macro camera when both cameras are focused to a distance equal to or smaller than 30 cm.

16. A mobile electronic device, comprising:
a first camera with a first field of view $FOV_1$;
a second, Macro camera with a Macro filed of view $FOV_M$ smaller than $FOV_1$; and
a device screen that includes a first screen section configured to display first image data from the first camera and a second screen section configured to display second image data from the Macro camera when both cameras are focused to a distance equal to or smaller than 30 cm, wherein both cameras can be focused to a distance smaller than 20 cm.

17. A mobile electronic device, comprising:
a first camera with a first field of view $FOV_1$;
a second, Macro camera with a Macro filed of view $FOV_M$ smaller than $FOV_1$; and
a device screen that includes a first screen section configured to display first image data from the first camera and a second screen section configured to display second image data from the Macro camera when both cameras are focused to a distance equal to or smaller than 30 cm, and wherein at least one camera can be focused to a distance between 5 and 10 cm.

18. A mobile electronic device, comprising:
a first camera with a first field of view $FOV_1$;
a second, Macro camera with a Macro filed of view $FOV_M$ smaller than $FOV_1$; and
a device screen that includes a first screen section configured to display first image data from the first camera and a second screen section configured to display second image data from the Macro camera when both cameras are focused to a distance equal to or smaller than 30 cm, and wherein both cameras can be focused to a distance of 10 cm or less.

19. A mobile electronic device, comprising:
a first camera with a first field of view $FOV_1$;
a second, Macro camera with a Macro filed of view $FOV_M$ smaller than $FOV_1$; and
a device screen that includes a first screen section configured to display first image data from the first camera and a second screen section configured to display second image data from the Macro camera when both cameras are focused to a distance equal to or smaller than 30 cm, wherein at least one camera can be focused to a distance of 5 cm or less.

* * * * *